United States Patent

Lauwers et al.

[15] 3,646,276

[45] Feb. 29, 1972

[54] AUTOMATIC SWITCHING SYSTEM, SELECTING SYSTEM AND CHECK CIRCUITS

[72] Inventors: Andre Ernest Antoon Lauwers, Muizen; Marcel Arthur Van Brussel, Hoboken, both of Belgium

[73] Assignee: International Standard Electric Corporation, New York, N.Y.

[22] Filed: Dec. 22, 1970

[21] Appl. No.: 100,762

Related U.S. Application Data

[63] Continuation of Ser. No. 698,463, Jan. 17, 1968, abandoned.

[52] U.S. Cl. ....................179/18 GE

[51] Int. Cl. ....................H04q 3/42

[58] Field of Search ....................179/18 G, 18 GE, 18 GF

[56] References Cited

UNITED STATES PATENTS

| | | | |
|---|---|---|---|
| 3,294,920 | 12/1966 | de Kroes et al. | 179/18.7 Y |
| 3,395,253 | 7/1968 | Warman | 179/18.7 Y |
| 3,423,537 | 1/1969 | Schluter et al. | 179/18.7 Y |
| 3,244,812 | 4/1966 | Nitsch et al. | 179/18.7 Y |
| 3,488,447 | 1/1970 | Baur et al | 179/18.7 Y |
| 3,493,690 | 2/1970 | Schluter | 179/18.7 Y |

*Primary Examiner*—Kathleen H. Claffy
*Assistant Examiner*—William A. Helvestine
*Attorney*—C. Cornell Remsen, Jr., Rayson P. Morris, Percy P. Lantzy, J. Warren Whitesel and Delbert P. Warner

[57] ABSTRACT

This case concerns a marker arrangement including a plurality of marker circuits built up as two-coordinate matrices and each grouping all the marking terminals adapted to mark pairs of distinct switching stages involved in the establishment of path of different types, e.g. path between junctor inlets and line circuits and between junctor outlets and outgoing trunks. Advantage: Gain of material Simple code check circuits may be associated to the matrices. This case also discloses a selecting system and check circuits.

1 Claims, 4 Drawing Figures

INVENTORS
ANDRÉ E. A. LAUWERS
BY MARCEL A. VAN BRUSSEL
ATTORNEY

Inventor

M. Lauwers - M. Van Brussel

By

Attorney

Patented Feb. 29, 1972 3,646,276

4 Sheets-Sheet 3

*Inventor*
M. Lauwers - M. Van Brussel

*By* [signature] *Attorney*

Inventor
M. Lauwers - M. Van Brussel
By [signature]
Attorney

AUTOMATIC SWITCHING SYSTEM, SELECTING SYSTEM AND CHECK CIRCUITS

This application is a continuation of application Ser. No. 698,463, filed Jan. 17, 1968, and now abandoned.

The present invention relates to an automatic switching system with a plurality of inlets of different types, e.g., line circuits, junctor circuit inputs, junctor circuit outputs, a plurality of switching paths of different types i.e., extending between pairs of inlets of different types and comprising one or more switching stages, and inlets of different types at least at one of their ends, and a plurality of control circuits adapted to control the establishment of said switching paths.

Such an automatic switching system is already known from the Belgian Pat. No. 538,654 (M.Den Hertog 102). In this known switching system each of the control circuits is associated to a single one of the switching stages so that in a switching system with a high number of switching stages the number of control circuits is correspondingly high.

It is therefore an object of the present invention to provide an automatic switching system of the above type but of a simpler structure than the known one.

The present automatic switching system is particularly characterized in that said control circuits are each associated and adapted to control inlets or distinct switching stages involved in the establishment of switching paths of different types.

Another characteristic of the present automatic switching system is that each said control circuit is a marking circuit enabling the selection of one of its output marking terminals which are coupled to the associated inlets or to input marking terminals of the associated distinct switching stages.

A further characteristic of this automatic switching system is that each said marking circuit has a number of output marking terminals at most equal to the total number of the associated inlets or at most equal to the sum of the input marking terminals of the associated distinct switching stages.

Automatic telecommunication switching systems are known wherein the switching network is constituted by a plurality of matrix-shaped switching stages which each have numbers of inlets and outlets that are powers of 2 and which are interconnected in such a manner that there exists only a single path between any two inlets of the network. Such a switching network is permitted to group the cross-points of each switching stage in a small number of groups each having a common input marking terminal and to control the establishment of a path by marking an inlet thereof as well as one of the input marking terminals in each of the switching stages involved in the establishment of this path.

In order to realize such a marking operation in accordance with the above Belgian patent one would associate to each switching stage an individual marking circuit having a number of output marking terminals equal to and coupled to the number of input marking terminals of the switching stage to which it is associated. In this case the common control circuit of the whole switching network would hence be constituted by a plurality of marking circuits each adapted to mark a relatively small number of input marking terminals. Such an arrangement would however be very inefficient since each such marking circuit is relatively complicated. Indeed, apart from the output marking terminals it must include an individual storage circuit for storing the binary code of the input marking terminal to be marked, an individual decoder circuit for decoding this binary code into an ordinary one and at least an individual check circuit for checking the exactness of the code stored.

Instead of proceeding in this manner, and according to the invention, all the output marking terminals adapted to mark distinct switching stages involved in the establishment of paths of different types, e.g., paths between junctor inlets and line circuits and between junctor outputs and outgoing trunk circuits, are grouped in a single marking circuit so that each such marking circuit now is adapted to mark a number of input marking terminals that is much higher than in the above-considered case. Due to this not only the code store circuit becomes simpler when compared with the sum of the code store circuits which had to be individually provided in the above case, but it has also been found very interesting to arrange all the output marking terminals in a two-coordinate matrix since this permits the use of a simple decoder circuit and to associate to the matrix relatively simple check circuits for checking the code stored and for checking the condition of the cross-points of the matrix, thus making the marking circuit not only simple but also very reliable.

Moreover when it is required that a switching stage must be able to be marked from two sources, it has been found unnecessary to completely double the above marking circuits. Indeed, according to the invention, only the above code store circuit, the decoder circuit and the code check circuit have to be doubled, whereas there must only be provided a single matrix and a single matrix cross-point check circuit. This has been made possible due to a very reliable construction of the latter circuits and due to a cross-point failure being immediately detected by the latter check circuit and having no effect on the condition of the other cross-points of the matrix.

A further characteristic of the present automatic switching system is that each said marking circuit enabling the selection of one of its output marking terminals coupled to input marking terminals of the associated distinct switching stages has output marking terminals of which at least one is coupled to at least two input marking terminals, one in at least two of the associated distinct switching stages.

In this manner in each marking circuit the number of output marking terminals to be provided is decreased.

Yet a further characteristic of the present automatic switching system is that each said marking circuit enabling the selection of one of its output marking terminals coupled to the associated inlets has its output terminals coupled to distinct ones of these inlets.

Still another characteristic of this automatic switching system is that the switching stages of each said switching path are connected in series between said inlets and that the control of the establishment of a switching path by said marking circuits is performed in such a manner that the marking circuit marking the inlets at one end of this path is operated first and maintained as long as this path must remain established, whereas the marking circuit marking the switching stages included in this path are such as to cause the successive operation of series cross-points in the switching stages involved in said path.

The present invention also relates to a selecting system for establishing a switching path through a switching network has a function of a code defining said path and stored in a memory, characterized in that it is constituted by a first decoder circuit and a second decoder circuit, that said first decoder circuit is constituted by a plurality of switching means which have each a first input terminal, a second input terminal and an output terminal and which are arranged in a two-coordinate matrix wherein the first input terminals of the switching means arranged in each row are connected to a row wire, whereas the second input terminals of the switching means arranged in each column are connected to a column wire and wherein the output terminals of said switching means are connected to said switching network, and that said second decoder circuit has a plurality of inputs and a plurality of outputs, these inputs being connected to said memory and these outputs controlling the row and column wire of said two-coordinate matrix, the storing of said code in said memory activating corresponding row and column wires of said two-coordinate matrix through said second decoder circuit due to which the switching means at the cross-point of these wires is activated in order to apply an activating signal to said switching network so as to operate other cross-points therein.

The present invention also concerns a selecting system including a plurality of switching means arranged at the cross-points of a matrix with a plurality of row and column wires, and control means for said switching means capable of activating a row wire and a column wire in order to operate the switching means at the cross-point of these wires, characterized in this, that it includes another said control means and exclusion means preventing the simultaneous operation of said one and other control means.

The present invention further also relates to a check circuit for a plurality of switching means arranged at the cross-points of a two-coordinate matrix having a plurality of row and column wires, the activation of such a row wire and such a column wire operating the switching means located at the cross-point of these wires, characterized in this, that it includes a plurality of first and second relays associated to said row and column wires respectively and each having a changeover contact, that the series connected break contacts of the changeover contacts of said first (second) relays are connected in series with a first resistance between the terminals of a first (second) DC source, each such break contact being shunted by a second resistance and each make contact of such changeover contact being coupled to activate a row wire of said two-coordinate matrix and the junction point of said first and the adjacent one of said second resistances being connected to a detector which operates when less or more than one of said second resistances are not shunted due to the opening of the associated break contact.

Finally, the present invention also concerns a check circuit for a plurality of asymmetrical impedances arranged at the cross-points of a two-coordinate matrix having a plurality of row and column wires, each pair of row and column wires being able to be coupled across the poles of a DC source in order to modify the state of the impedance arranged at the cross-point of this pair of wires, characterized in this, that each said pair of row and column wires is connected in series with resistances across the poles of a second DC source of opposite polarity to the first so as not to influence the state of said asymmetrical impedances, and detecting means associated with said resistances to detect an increase of current therethrough beyond a predetermined value, e.g., due to a short circuit of one of said asymmetrical impedances.

The above-mentioned and other objects and features of the invention will become more apparent and the invention itself will be best understood by referring to the following description of embodiments taken in conjunction with the accompanying drawings in which.

Figure 1:
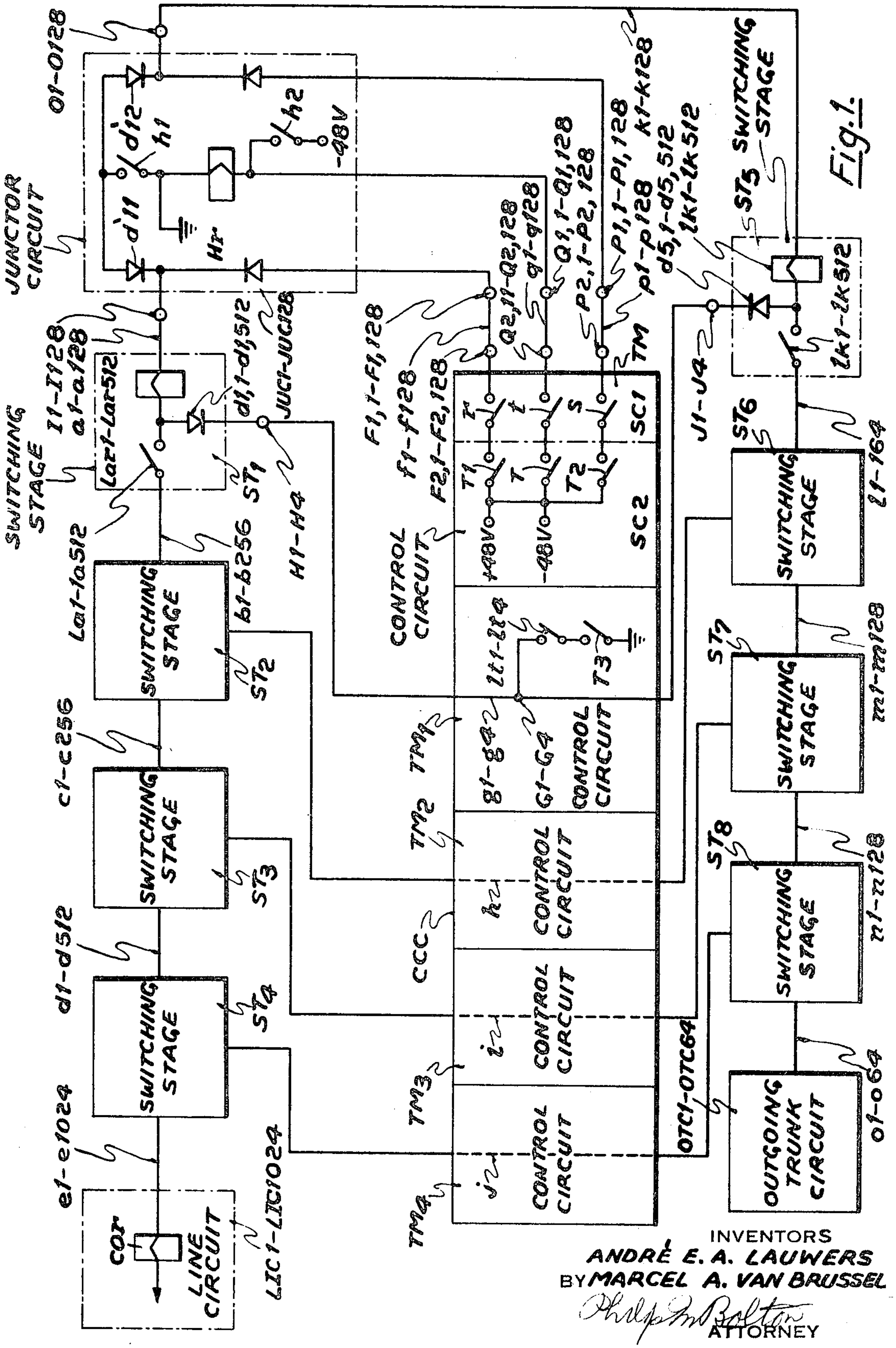
FIG. 1 is a junction diagram of an automatic switching system according to the invention.

Principally referring to FIG. 1 the automatic switching system shown therein is part of an automatic telecommunication switching system and includes a plurality of inlets of different types e.g., inputs I1–I128 and outputs O1–O128 of junctor circuits JUC1–JUC1–128, line circuits LIC1–IC1024 and outgoing trunk circuits OTC1–OTC64. It further includes a plurality of switching paths of different types i.e., extending between pairs of inlets of different types and comprising switching stages, and inlets of different types at least at one of their ends. For instance, switching paths of one type comprise the series connected switching stages ST1–4 and extend between the pairs of inlets of different types I1–I128 and LIC1–LIC1024 whereas switching paths of another type comprise the series connected switching stages ST5–8 and extend between the pairs of inlets of different types O1–O128 and OTC1–OTC64. The automatic switching system finally includes the control circuits TM and TM1–4 adapted to control the inlets I1–I128, O1–O128 and the switching stages ST1,5; ST2,6; ST3,7 and ST4,8 respectively in order to control the establishment of the above switching paths.

The junctor inputs I1–I128, the switching stages ST1–ST4 and the line circuits LIC1–LIC1024 are interconnected by the links *a*1–*a*128, *b*1–*b*256, *c*1–*c*256, *d*1–*d*512 and *e*1–*e*1024, whereas the junctor outputs O1–O128, the switching stages ST5–8 and the outgoing trunks OTC1–OTC4 are interconnected by the links *k*1–*k*128, *l*1–*l*64, *m*1–*m*128, *n*1–*n*122 and O1–O64. The junctor circuits JUC1–JUC128 further have input marking terminals F1, 1–F1,128 and P1, 1–P1,1–P1,128 and input control terminals Q1,1–Q1,128.

Each junctor circuit input such as I1 of the junctor JUC1 shown is coupled, on the one hand to the input marking terminal F1,1 of this junctor and, on the other hand to ground via a decoupling diode rectifier *d*'11 and a make contact *h*1 of a relay H*r* included in the junctor circuit JUC1. Likewise each junctor circuit output such as O1 of the junctor JUC1 is coupled, on the one hand to the input marking terminal P1,1 of this junctor and, on the other hand to the above ground via a decoupling diode rectifier *d*'12 and the above make contact *h*1. The winding of the relay H*r* is connected between the above ground and, on the one hand, the input control terminal Q1,1 and, on the other hand, a (−48 volts potential via a make contact *h*2 of the relay H*r*. Each junctor circuit JUC1–JUC1–128 hence has two input marking terminals, F1, 1–F1,128, P1, 1–P1,128 and one input control terminal Q1, 1–Q1,128, the former being connected to the input and output terminals of the junctor circuit. The latter terminals are on their turn connected to one of the 128 *a*-links and to one of the 128 *k*-links respectively. Since there are 128 junctor circuit inputs and 128 junctor circuit outputs, these inputs as well as these outputs may be identified by a seven-bit binary code.

The switching stage ST1 has 128 inlets which are connected to distinct ones of the above 128 *a*-links *a*1–*a*128, 256 outlets which are connected to distinct ones of the above 256 *b*-links, *b*1–*b*256, 4 input marking terminals, H1–H4 and 512 switching means L*ar*1–L*ar*512 each having a first input terminal connected to one of the above 128 inlets, an output terminal connected to one of the above 256 outlets and a second input terminal connected to each of the 4 input marking terminals of the switching stage ST1. Each of these switching means is capable, when a marking signal is applied to its second input terminal via an input marking terminal, to establish a connection between its first input terminals and its output terminal i.e., between an *a*-link and a *b*-link. Each switching means is constituted by a relay winding which is connected in series, on the one hand, with a diode rectifier between its first input and second input terminals and, on the other hand, with a make contact of the relay between its first input terminal and its output terminal. For instance, the switching means of the switching stage ST1 is constituted by the winding of relay L*ar*1 which is connected in series, on the one hand, with the diode rectifier *d*1,1 between the *a*-link *a*1 and the input marking terminal H1 and, on the other hand, with the make contact 1*a*1 between the *a*-link *a*1 and the *b*-link *b*1.

It should be noted that the number of switching means is twice higher than the number of outlets due to the fact that the output terminals of the switching means are joined two by two as will be explained later with respect to FIG. 2. Moreover, due to the second input terminals of 512 switching means being connected to the above four input marking terminals of the switching stage ST1 there are in fact formed 4 groups of each 128 switching means, the switching means of each group being connected to a same input marking terminal of the switching stage ST1. Each such group of input marking terminal may hence be identified by a two-bit binary code.

The switching stage ST5 has 128 inlets which are connected to distinct ones of the above 128 *k*-links, *k*1–*k*128, 64 outlets which are connected to distinct ones of the above 64 *l*-links 11–164, 4 input marking terminals J1–J4 and 512 switching means L*kr*1–L*kr*512 each having a first input terminal connected to one of the above 128 inlets, an output terminal connected to one of the above 64 outlets and a second input terminal connected to one of the above four input marking terminals of the switching stage ST5. These switching means are analogous to those included in the switching stage ST1 and the switching means is for instance constituted by the winding of relay Lkr1 which is connected in series, on the one hand, with the diode rectifier d5,1 between the k-link k1 and the input marking terminal J1 of the switching stage ST5 and, on the other hand, with the make contact 1k1 of Lkr1 between the k-link k1 and the l-link l1. The number of switching means is eight times higher than the number of outlets due to the fact that the output terminals of the switching means are joined eight by eight as will be explained later with respect to FIG. 2. Also there are formed 4 groups of each 128 switching means, the switching means of each group being connected to a same input marking terminal of the switching stage ST5. Each such group or input marking terminal may hence also be identified by a two-bit binary code.

The control circuit TM has 256 output marking terminals F2, 1–F2,128, P2,1–P2,128 and 128 output control terminals Q2,1–Q2,128 which are connected to the 256 input marking terminals F1,1–F1,128, P1,1–P1,128 and to the 128 input control terminals Q1,1–Q1,128 of the 128 junctor circuits JUC1–JUC128 respectively, via the marking leads f1–f128 and p1–p128 and the control lead q1–q128 respectively. The control circuit TM is a marking circuit and is able to select and mark, by timing means (not shown) included therein, a single one of its 256 output marking terminals together with a single one of its 128 output control terminals. This control or marking circuit includes a first selection circuit SC1 adapted to select the pair of output marking terminals and the control terminal connected to the junctor circuit of which the seven-bit binary code has been stored in SC1 and a second selection circuit SC2 adapted to select a single one of the already selected pair of output marking terminals upon a binary code indicating that a junctor circuit input or output is concerned being stored in SC2 and to mark by the above timing means the thus selected output marking terminals and the already selected output control terminal. For instance, the selection circuit SC1 is adapted to select the junctor circuit JUC1 shown by closing the make contacts r, s, t which are supposed to be connected to the output marking terminals F2,1 and P2,1 and to the output control terminal Q2,1 of TM, the latter terminals being themselves connected to the input marking terminals F1,1 P1,1 and to the input control terminal Q1,1 of this junctor circuit JUC1. The selection circuit SC2 is adapted to select one of the output marking terminals F2,1, Pq,1, by selecting one of the corresponding make contacts T1, T2 e.g., T1 and the timing means is adapted to close the selected make contact T1. Due to the closure of the make contacts T1 and r a +48 volts marking potential is applied to the output marking terminal F2,1 whereas due to the closure of the make contacts T and t a −48 volts control potential is applied to the output control terminal Q2,1.

It should be noted that the contacts T1, T2, T are provided in common for the 128 output marking terminals F2,1–F2,128 coupled to the 128 inputs I1–I128, for the 128 output marking terminals P2,1–P2,128 coupled to the 128 outputs O128 and for the 128 output control terminals Q2,1–Q2,128 coupled to the 128 input control terminals Q1,1–Q1,128 respectively. In a preferable embodiment these contacts are constituted by transistors.

From the above it also follows that the control circuit TM is only able to select and mark one of the inlets of the switching system i.e., one among the total number of 256 junctor circuit inputs and outputs.

The control circuits TM1–4 are analogous to one another and therefore only the control circuit TM1 is now considered. This control circuit TM1 has 4 output marking terminals G1–G4 which are each connected via marking leads g1–g4 to two input marking terminals H1,J1–H4,J4, one in each of the switching stages ST1 and ST5. The control circuit TM1 is able to select and mark by timing means (not shown) included therein, the single one of these output marking terminals of which the two-bit binary code has been stored in TM1. For instance the control circuit TM1 is able to select an output marking terminal G1–G4 by closing a make contact lt1–lt4 and the timing means are able to mark it by closing the make contact T3 since due to the closure of both make contacts lt1–lt4 and T3 a marking ground is applied to this control terminal G1–G4. The contact T3 is provided in common for all the output marking terminals.

The control circuits TM 2–4 are provided with output marking terminals which are connected to the input marking terminals of the respective pairs of switching stages ST2, ST6; ST3, ST7 and ST4, ST8 and are each able to select and mark one of the r output marking terminals and hence two of the input marking terminals of the associated switching stages, the marking operations being performed under the control of timing means.

The above-described automatic switching system operates as follows. When for instance a switching path must be established between a predetermined junctor circuit input, e.g., I1, or a-link a1 and a predetermined line circuit, e.g., LIC1, or e-link e1 through predetermined links b1 to d1, the seven-bit binary code identifying this junctor circuit input is stored in the selection circuit SC1 of the control circuit TM, the binary code indicating that a junctor circuit input is concerned is stored in the selection circuit SC2 of the control circuit TM, and the binary codes identifying the output marking terminals associated to the groups to which these links b1 to d1 belong are stored in the control circuits TM1–4 respectively. Under the control of the codes stored the selection circuit SC1 of the control circuit TM selects the junctor circuit JUC1 shown by closing the corresponding contacts r, s and t whereas the selection circuit SC2 selects the corresponding output marking terminal F2,1 by selecting the make contact T1. The control circuits TM1–4 select corresponding output marking terminals by closing corresponding contacts e.g., G1 and lt7 in TM1.

Upon the above codes being stored the timing means are started. After a predetermined time interval which is sufficient for the closure of the above contacts r,s,t, lt1 the contacts T1 and T of the control circuit TM are closed for a predetermined time interval sufficient for the establishment of the switching path, i.e., for the operation of the switching stages ST1–4, whereas the contacts such as T3 of the control circuit TM1–4 are successively closed during time intervals sufficient for the operation of the corresponding switching stages. Hereby a make contact T3 of a control circuit TM1–3 is only opened after the corresponding contact T3 of the next control circuit TM2–4 has been closed.

Due to the closure of the make contacts T1 and r the +48 volts marking potential is applied to the input I1 of the junctor circuit JUC1 via these make contacts, output marking terminal F2,1 marking lead f1,1 and input marking terminal F1.

By the closure of make contacts T and t the −48 volts control potential is applied to the input control terminal Q1 of this junctor circuit JUC1 via these make contacts the output marking terminal Q2,1 and the control lead q1. The application of the +48 volts marking potential remains temporarily without effect, but due to the application of the −48 volts control potential to the input control terminal Q1,1 and hence to one end of the winding of the relay Hr, the latter relay is energized since the other end of its winding is grounded. The closure of make contact h1 of this relay remains temporarily without effect due to the potential of the input I1 being at +48 volts and due to the presence of the diode d'11, but by the closure of make contact h2 the relay Hr is locked to −48 volts.

By the closure of the make contacts T3 and lt1 in the control circuit TM1 a marking ground is applied to the corresponding output marking terminal G1 due to which the relay Lar1 is energized in the following circuit: +48 volts potential on the junctor circuit input I1, link a1, winding of relay Lar1, diode rectifier d1,1, input marking terminal H1, marking lead g1, output marking terminal G1, make contacts lt1 and T3, ground. By the closure of make contact la1 of the operated relay Lar a switching connection is established between the junctor input I1 and the b-link b1.

It should be noted that although the control circuit TM1 also marks the input marking terminal J1 of the switching stage ST5 this remains without effect on the condition of the relay *Lkr*1 since the junctor circuit output O1 has not been selected and marked by the control circuit TM.

In an analogous manner as already described for the control circuit TM1, when the timing means close a contact T3 in the control circuit TM2 a marking ground is applied to the already selected output marking terminal and hence to one of the input marking terminals in each of the switching stages ST2 and ST6. The relay in the switching stage ST2 which is connected between the marked *b*-lead and the marked input marking terminal of ST2 can however not operate since both ends of this relay are grounded.

However, as soon as the timing means open the make contact T3 in the control circuit TM1 the above short circuit is removed due to which the above relay in the switching stage ST2 is energized in series with relay *Lar*1 between the +48 volts marking potential on input I and the marking ground in control circuit TM2. Thus a switching path is established between this input I1 and a *c*-link *c*1 via the *b*-link *b*1 and two relays.

In analogous manner the control circuits TM3 and TM4 then control the operation of the switching stages ST3 and ST4 so that finally a switching path is established between the input I1 and the relay *Cor*1. When this has happened the timing means open the make contacts T1 and T so that the control circuit TM becomes free to control the establishment of another switching path. The switching path established however remains established due to the relay *Cor*1 being maintained energized between −48 volts and the ground connected to the junctor input I1 via the make contact *h*1 and the diode *d*'11.

Figure 2:
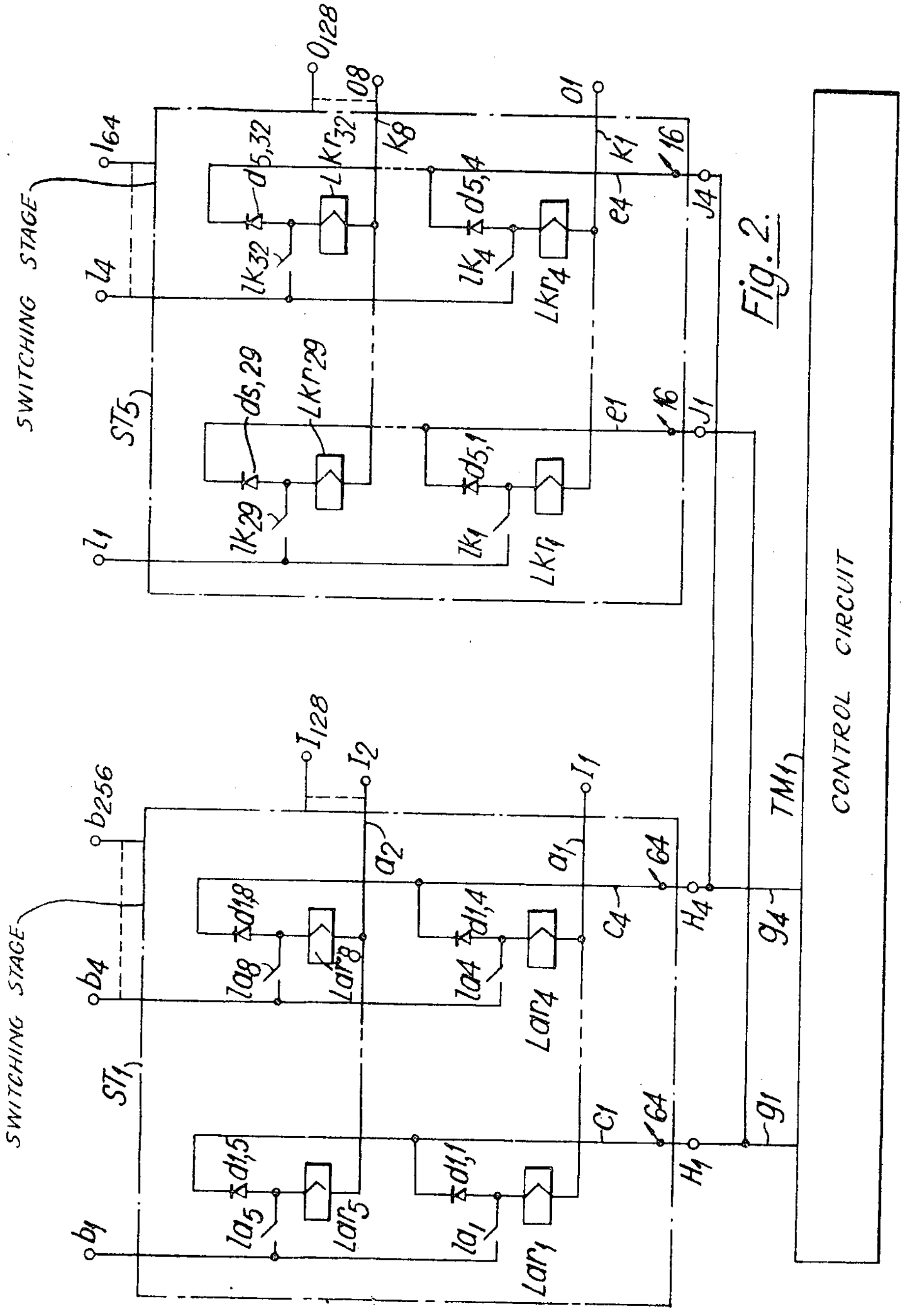
FIG. 2 represents in more detail the switching stages ST1 and ST5 shown in FIG. 1.
Figure 3:
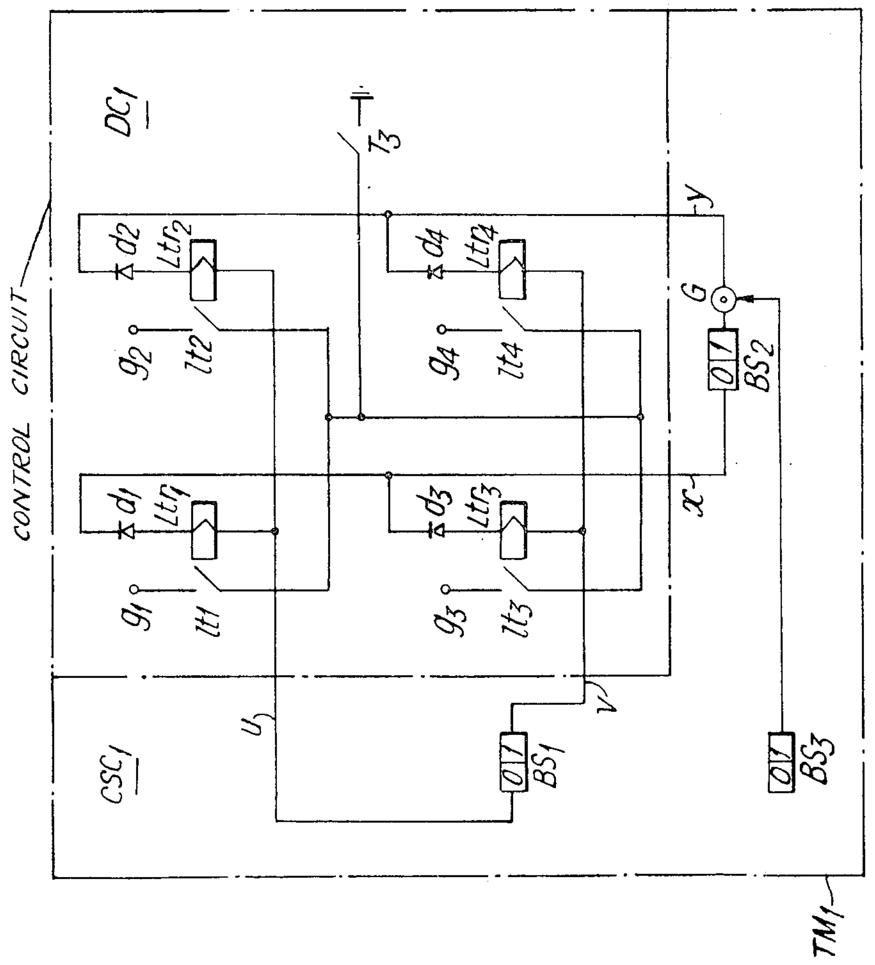
FIG. 3 represents in more detail the control circuit TM1 shown in FIG. 1.

Referring to FIGS. 2 and 3 the switching stages ST1 and ST5 (FIG. 2) and their control by the control circuit TM1 (FIG. 3) are shown in more detail.

Principally referring to FIG. 2 the switching stage ST1 includes 64 identical multiswitches ST1/1–ST1/64 only one of which ST1/1 is represented in detail. This multiswitch ST1/1 is constituted by eight switching means which are each constituted by a relay winding one end of which is connected to the anode of a rectifier diode and by a make contact one end of which is connected to the junction point of this relay winding and this rectifier diode. The other end of the relay winding, the cathode of the rectifier diode and the other end of the make contact constitute the first and second input terminal, and the output terminal of the switching means respectively. For instance, one of the eight switching means is constituted by the relay winding *Lar*1 one end of which is connected to the anode of the diode rectifier *d*1,1 and by the make contact l*a*1 connected to the junction point of *Lar*1 and *d*1,1. The above eight switching means are arranged in a two-coordinate matrix having two rows and four columns and wherein the first input terminals of the switching means of each row, i.e., the other ends of the relay windings of each row, are connected to a row wire, whereas the second input terminals of the switching means of each column, i.e., the cathodes of the rectifier diodes of each column, are connected to an input marking terminal via a column or input marking wire. Further, the output terminals of the switching means of each column, i.e., the other ends of the make contacts of the relays of each column, are connected to a common output terminal. More particularly, the other ends of the relay windings *Lar*1–4 and *Lar*5–8 are connected to the row wires *a*1 and *a*2 respectively; the cathodes of the diode rectifiers *d*1,1, *d*1,5; ... ; *d*1,4, *d*1,8 are connected to the input marking terminals H1–4 via the column or input marking wires *c*1 to *c*4 respectively; and the other ends of the make contacts l*a*1, l*a*5 to l*a*4, l*a*8 of the relays L*ar*1, L*ar*5, to L*ar*4, L*ar*8 are connected to the common output terminals *b*1 to *b*4 respectively. The latter output terminals are connected to four of the 256 *b*-links leading to the adjacent switching stage ST2, whereas the four column or input marking wires *c*1–*c*4 are connected to the four output marking leads *g*1–*g*4 of the control circuit TM1 respectively. Likewise the four column wires of each of the other switches included in the switching stage ST1 are connected to these marking leads *g*1–*g*4 which are hence each connected to 64 column wires, one in each of the switches, as indicated by the multiplying arrow. The two row wires *a*1–2 constitute *a*-links and are connected to the inputs I1–2 of two junctor circuits. Likewise the two row wires of each of the remaining switches included in the switching stage ST1 constitute *a*-links and are connected to the inputs of two other junctor circuits, there being in total 128 such junctor circuits.

The switching stage ST5 includes 16 identical switches ST5/1–ST516 only one of which ST5/1 is represented in detail. This switch ST5/1 is constituted by 32 switching means which are identical to the switching means of the switching stage ST1 and which are arranged in a two-coordinate matrix with eight rows and four columns. The other ends of the relay windings Lkr1–4 to Lkr29–32 are connected to the row wires *k*1 to *k*8 respectively; the cathodes of the diode rectifiers *d*5,1, ...,*d*5,29 to *d*5,4, ..., *d*5,32 are connected to the column wires *e*1 to *e*4 respectively; and the other ends of the make contacts *lk*1, ..., *lk*29 to *lk*4, ..., *lk*32 are connected to the common output terminals *l*1 to *l*4 respectively. The latter output terminals are connected to four of the 64 *l*-links leading to the adjacent switching stage ST6, whereas the four input marking column wires *e*1–*e*4 terminating in the input marking terminals J1–4 are connected to the four output marking leads *g* 1–*g*4 of the control circuit TM1 respectively. Likewise the four column wires of each of the other switches included in the switching stage ST5 are connected to these marking leads *g*1–*g*4 which are hence each connected to 16 column wires, one in each of the switches, as indicated by the multiplying arrow. The eight row wires *k*1–8 constitute *k*-links and are connected to the outlets O1–8 of eight junctor circuits. Likewise the eight row wires of each of the remaining switches included in the switching stage ST5 constitute *k*-links and are connected to the outlets of eight other junctor circuits of the total number of 128 junctor circuits.

Principally referring to FIG. 3 the control circuit TM1 is constituted by a code store circuit CSC1 and by a selection or decoder circuit DC1. The decoder circuit DC1 is constituted by four switching means which are each constituted by a relay winding one end of which is connected to the anode of a diode rectifier and by a make contact one end of which is connected to ground via the make contact T3. The other end of the relay winding, the cathode of the diode rectifier and the other end of the make contact constitute the first and second input terminals and the output terminal of the switching means respectively. For instance, one of the four switching means is constituted by the relay winding Ltr1 one end of which is connected to the anode of the diode rectifier *d*1 and by the make contact *lt*1 one end of which is connected to ground via the above make contact T3. The above four switching means are arranged in a two-coordinate matrix having two rows and two columns. Therein the first input terminals of the switching means of each row, i.e., the other ends of the relay windings of each row, are connected to a row wire; the second input terminals of the switching means of each column, i.e., the cathodes of the diode rectifiers of each column, are connected to a column wire, and the output terminals of the switching means i.e., the other ends of the make contacts, are connected to the above-mentioned output marking leads *g*1–*g*4. More particularly, the other ends of the relay windings L*tr*1–2 and L*tr*3–4 are connected to the row wires *u* and *v* respectively; the cathodes of the diode rectifiers *d*1, *d*3 and *d*2, *d*4 are connected to the column wires *x* and *y* respectively, and the other ends of the make contacts *lt*1–4 are connected to the output marking terminals G1–G4 which are connected to the output marking leads *g*1–*g*4 respectively.

The code store circuit CSC1 includes two code store bistate devices BS1 and BS2 and an enabling bistate device BS3, these bistate devices being normally in their 0-condition. The 0-output and the 1-output of the bistate device BS1 are connected to the row wires *u* and *v* of the decoder circuit DC1 respectively. The O-output of the bistate device BS2 is connected to the column wire *x*, whereas the column wire *y* is connected to a first terminal of the AND-gate C the second terminal of which is connected to the 1-output of the bistate device BS2 and the third terminal of which is connected to the 1-output of the bistate device BS3. The bistate devices BS1 and BS2 are adapted to store the two-bit code characterizing one of the four output marking leads *g*1–*g*4 i.e., one of the four groups of 64 *b*-links or one of the four groups of 16 *l*-links. One bit of this two-bit code is hereby stored in BS1 and the other bit is stored in BS2. The enabling bistate device BS3 is set to its 1-condition each time a code has been stored in the bistate device BS1 and BS2, for a reason to be given later.

It should be noted that the switching stages ST2, 3, 4, 6, 7, 8 and the control circuits TM2–4 are built up in an analogous way as the switching stages ST1,5 and as the control TM1 respectively. The control circuit TM is constituted by a plurality of 256 switching means which are arranged in a two-coordinate matrix and each provided with three make contacts, such as *r*, *s*, *t* in FIG. 1, the corresponding make contacts of all these switching means being grounded via the common make contacts T1, T2 and T respectively. The timing means included in the control circuits TM, TM1–4 are again not shown.

Referring to the FIGS. 2 and 3 the already above-described establishment of a switching path between a predetermined junctor circuit input and a predetermined line circuit through the switching stages ST1–4 is described in more detail hereinafter, as far as concerns the switching stage ST1 and the control circuit TM1, supposing that codes are stored in the control circuits TM and TM1.

Under the control of the code stored in the control circuit TM and of the timing means included therein a +48 volts potential is connected to the input I1 of a junctor circuit, and hence to the row wire *a*1 of the switching stage ST1, in the manner described above with respect to FIG. 1.

Under the control of the code stored in the bistate devices BS1 and BS2 of the code store circuit CSC1 of the control circuit TM1 the selection or decoder circuit DC1 of this control circuit TM1 selects one of its four output marking leads *g*1–4. Indeed, when it is for instance supposed that the bistate devices BS1 and BS2 have been set in their 0- and 1-conditions respectively, followed by the setting of the bistate device BS3 to its 1-condition, the row wire *u* is activated and the column wire *x* is deactivated. Consequently the relay L*tr*1 is energized in the following circuit: activated row wire *u*, winding of relay L*tr*1, diode *d*1, deactivated column wire *x*. In an analogous manner when the bistate devices BS1–2 are in the conditions 0,0; 1,1 and 1,0 the relays L*tr*2, L*tr*3 and L*tr*4 are energized, current being only able to flow to the deactivated 1-output of the bistate device BS2 when the bistate device BS3 controlling the gate G is in its 1-condition. The gate G is required since the rest or 0-condition of the bistate devices BS1 and BS2 the relay L*tr*2 would otherwise be operated in the following circuit: activated row wire *u*, winding of relay L*tr*2, diode *d*2, deactivated column wire *y*.

Due to the operation of the relay L*tr*1 the make contact *lt*1 is closed and afterwards the make contact T3 is closed for a predetermined time interval by the timing means, as already described above. Consequently a marking ground is applied to the output marking lead *g*1 via the make contacts T3 and *lt*1 and hence to one column wire in each of the 64 switches of the switching stage ST1 and to one column wire in each of the 16 switches of the switching stage ST5, more particularly to input marking terminals H1 and J1 and to the column or input marking wires *c*1 and *e*1. Due to this the relay L*ar*1 of the switching stage ST1 is energized in the following circuit: marking potential of +48 volts coupled to input I1, row wire *a*1, winding of relay L*ar*1, diode *d*1,1, column wire *c*1, output marking lead *g*1, make contacts *lt*1 and T3, ground. By the operation of the relay L*ar*1 the make contact *la*1 is closed and consequently the input I1 is connected to the *b*-link *b*1 leading to the switching stage ST2 through the winding of relay L*ar*1.

None of the relays of the switching state ST5 which are coupled to column wire *e*1 can be operated since none of the row wires or *k*-links of this switching stage is activated.

In the above described automatic switching system the output marking terminals of the control circuit TM1 are each connected to two input marking terminals, one of each of the switching stages ST1 and ST5. Such a simultaneous control of these switching stages belonging to switching paths of different types is only possible due to the fact that the control circuit TM is adapted to mark only a single one of the inlets of these paths i.e., one of the 256 junctor inputs and outputs at a time. Indeed, only in this case one switching path is established at a time. It is clear that due to each of its output marking terminals being provided in common for two input marking terminals of the switching stages ST1,5 the control circuit TM1 becomes relatively simple. This is also the case for the control circuits TM2–4.

The simultaneous establishment of two different switching paths at a time would for instance occur when the control circuit TM1 would simultaneously control one of the switching stages interconnecting the junctor circuit inputs and the line circuits and one of the four switching stages interconnecting these same junctor circuit inputs and incoming trunk circuits. Instead of providing two different control circuits TM1 in this case, it has however found preferable to maintain a single control circuit TM1 and to provide it with a number of output marking leads equal to the sum of the input marking leads of the switching stages to be controlled. For instance when this sum is equal to 32 the control circuit TM1 shown in FIG. 4 may be used. Principally referring to this figure, the control circuit TM1 includes two individual code store circuits CSCA and CSCB, two individual decoder or selection circuits DCA and DCB, a common decoder or selection circuit DCAB, two individual check circuits CCA and CCB and a common check circuit CCAB, the check circuits being associated to the common decoder circuit DCAB. The circuits CSCB, DCB and CCB are represented by a single block C.

The code store circuit CSCA includes five code bistate devices BS1–5 and an enabling bistate device BS6. The bistate devices BS1–5 are each adapted to store a distinct bit of the five-bit binary code characterizing the above 32 output marking leads and are arranged in a first group of three bistate devices, namely BS1–3, and in a second group of two bistate devices, namely BS4–5.

The code store circuit CSCB is identical to the code store circuit CSCA and is therefore not shown in detail.

The decoder circuit DCA includes 12 AND-gates G1–8 and G9–12 which are controlled by the bistate devices BS1–3 and BS4–5 respectively. For instance, the AND-gate G1 is conditioned by the 0-outputs of the bistate devices BS1–3; the AND-gate G8 is conditioned by the 1-outputs of these bistate devices; the AND-gate G9 is conditioned by the 0-outputs of the bistate devices BS4–5; and the AND-gate G12 is conditioned by the 1-outputs of these bistate devices. The AND-gates G1 and G9 are moreover controlled by the 1-output of the bistate device BS6. The outputs of the AND-gates G1–12 are connected to the relays R*ar*–R*lr* via a not shown amplifier respectively, the contacts *ra*–*rl* of these relays controlling the decoder circuit DCAB through the check circuit CCA.

The decoder circuit DCAB includes 32 switching means which are arranged in a two-coordinate matrix with four rows and eight columns. Each of these switching means is constituted by a relay winding one end of which is connected to the anode of a diode rectifier and by a make contact one end of which is connected to a marking ground via the above-mentioned make contact T3. The other end of the relay winding, the cathode of the diode rectifier and the other end of the make contact of each switching means constitute the first and second input terminals and the output terminal of this switching means respectively. For instance one of the switching means is constituted by the relay winding L*tr*1 one end of which is connected to the anode of the diode rectifier *d*1 and by the make contact *lt*1 one end of which is connected to a marking ground via the make contact T3. The first input terminals of the switching means arranged in each row are connected to a row wire *i*1, ..., *l*1; the second input terminals of the switching means arranged in each column are connected to a column wire *a*1, ..., *h*1; and the output terminals of the 32 switching means are connected to the 32 output marking leads *g*1–32 respectively. For instance, the other ends of the windings of the relays L*tr*1, ..., L*tr*8 arranged in the first row are connected to the row wire *i*1; the cathode of the diode rectifiers *d*1, ... *d*25 arranged in the first column are connected to the column wire *a*1; and the other ends of the make contacts *lt*1–32 are connected to the output marking terminals G1–G32 which are connected to the output marking leads *g*1–*g*32 respectively.

The check circuit CCA includes two potentiometer circuits. The first is constituted by the resistances R1, R*a*, ., R*h* which are connected in series with a make contact *z*1 of a control relay Z*r* (not shown) between ground and a −48 volts potential. The resistances R*a*, ..., R*h* are associated to the relays R*ar*, ... R*hr* respectively and are each connected in parallel with the break contact of the changeover contacts of the associated relay. The make contacts of these changeover contacts are each connected to a respective column wire *a*1, ... , *h*1 of the decoder circuit DCAB via a respective resistance R″*a*, ..., R″*h*. The junction point of the resistances R1 and R*a* is connected to the potential detector circuit PD1. The second potentiometer circuit is constituted by the resistances R2, R*i*, ..., R1 which are connected in series with a make contact *z*2 of the control relay Z*r* between a +48 volts potential and ground. The resistances R*i*, ... R*l* are associated to the relays R*ir*, ... R*lr* respectively and are each connected in parallel with the break contact of a changeover contact *ri*, ..., *rl* of the associated relay. The make contacts of these changeover contacts are each connected to a respective row wire *i*1, ..., *l*1 of the decoder circuit DCAB. The junction point of the resistances R2 and R*i* is connected to the potential detector circuit PD2.

The check circuit CCB is identical to the check circuit CCA and is therefore not shown in detail, except that it is controlled by the contacts *z*′1 and *z*′2 of a control relay Z′*r* (not shown). The relays Z*r* and Z′*r* form part of an obvious exclusion circuit which prevents both relays from being operated simultaneously. It should be noted that the contacts *z*1, *z*2 and *z*′1, *z*′2 (not shown) are provided in common for all the control circuits TM and TM1–4 and that each of the relays, e.g., Z*r*, is energized by the timing means upon the codes being inscribed in the code store circuits of TM and TM1–4, the operation of a cross-point relay of these control circuits being only possible after the closure of *z*1 and *z*2.

The check circuit CCAB includes a potentiometer circuit which is connected between a −48 volts potential and ground via the resistance R3, the resistance R′*i*, ..., R′*l*, the windings of the relays L*tr*1–8, ..., L*tr*25–32, the diode rectifiers *d*1–8, ..., *d*25–32 and the resistances R′*a*, ..., R′*h*, the junction point of the resistances R3 and R′*i*, ..., R′*l* being connected to the potential detector PD3. These diode rectifiers normally prevent current to flow from the above ground to the −48 volts potential.

Preferable values of the above resistances are 10 kilohms, except for R″*a* to R″*h* which are preferably equal to 1,1 kohm, the potential detector PD3 responding to a potential value of about −32 volts and higher.

Figure 4:
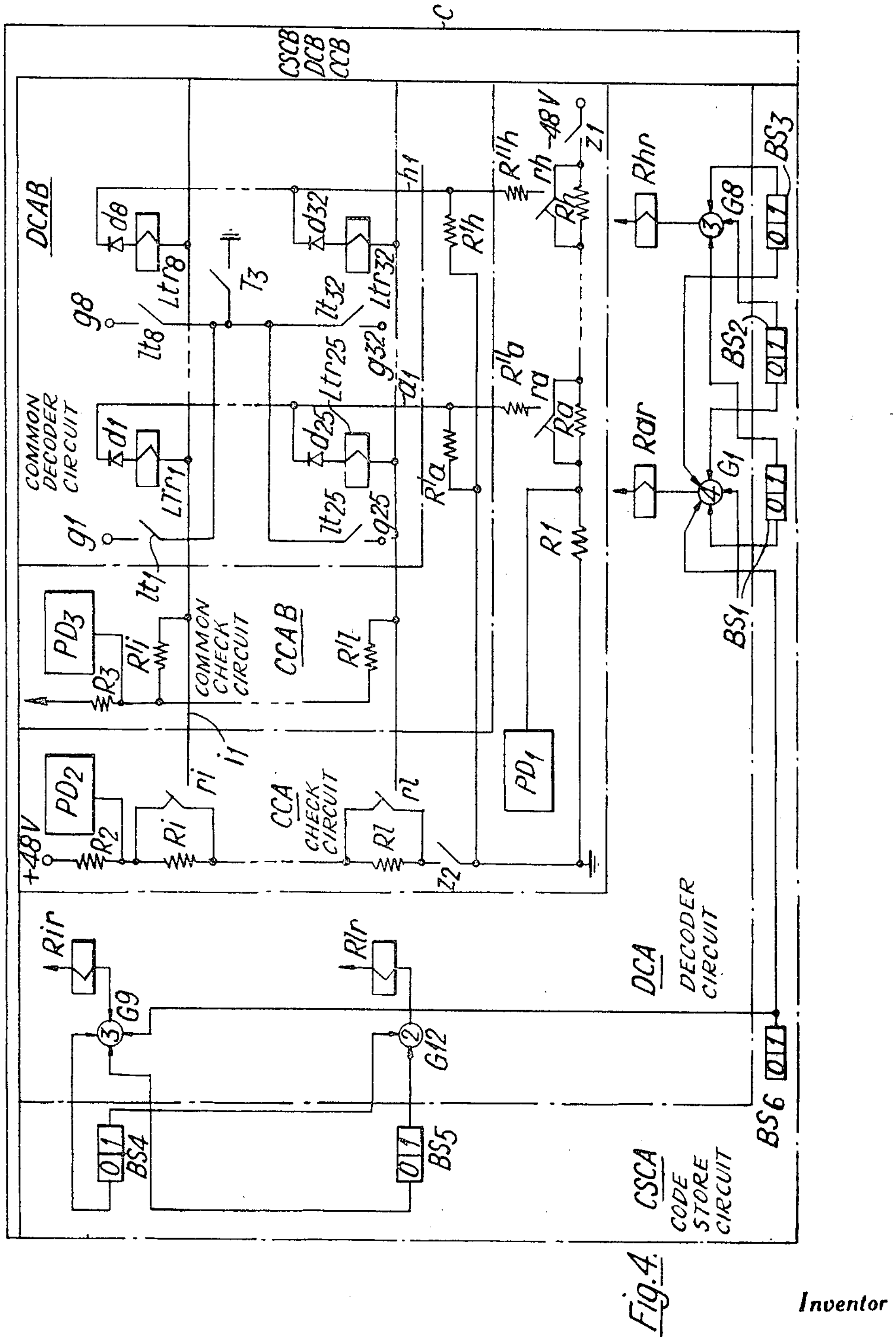
FIG. 4 shows selecting systems and check circuits according to the invention.

Principally referring to FIG. 4 control circuit TM1 operates as follows. When one of the 32 output marking leads *g*1–32 must be marked, a corresponding five-bit binary code is stored in the bistate device BS1–5 of the code store CSCA and the enabling bistate device BS6 is set to its 1-condition. Consequently the timing means are started due to which the control relay Z*r* is operated thus preventing the operation of the relay Z′r. When the code is for instance 00011 the bistate devices BS1–5 remain in their 0-condition, whereas the bistate devices BS4–5 are set to their 1-condition. Consequently the outputs of the gates G1 and G12 are activated so that the associated relays R*ar* and R*lr* are energized. By the change of position of the contacts *ra* and *rl* the relay L*tr*25 is operated in the following circuit: ground, closed make contact *z*2, changeover contact *rl* in its work position, row wire l1, winding of relay L*tr*25, diode rectifier *d*25, column wire *a*1, resistance R″*a*, changeover contact *ra* in its work position, changeover contacts *rb*, ..., *rk* (not shown) and *rh* in their rest position, make contact *z*1, potential of −48 volts. By the closure of the contact *lt*25 the output marking lead *g*25 is connected to the open make contact T3 which is afterwards temporarily closed by the above timing means in order to apply the marking ground to this marking lead *g*25.

The aim of the check circuit CCA is to check if only one relay in the group of relays R*ar*–R*hr* and only one relay in the group of relays R*ir*–R*lr* have been energized. Indeed, when this is for instance the case for the group of relays R*ar*–R*hr* the potential detector PD is connected to the junction point of the resistance R1 and a single one of the identical resistances R*a*, ... R*h*, both these resistances being connected in series between ground and −48 volts. In this case the potential detector PD1 does not react to the resultant potential. However, when none or more than one relay of the group of relays R*ar*–R*hr* have been energized, the potential detector PD1 reacts to the resultant potential appearing at the above junction point since none or more than one of the resistances R*a*, ..., R*h* are then connected between ground and −48 volts in series with R1. The potential detector PD2 has an analogous function as PD1.

With regard to the check circuit CCAB it should first be noted that the condition of the potential detector PD3 is only consulted when the decoder circuit DCAB is not operated. Indeed when a cross-point of the decoder circuit DCAB is operated e.g., relay L*tr*1, the potential detector PD3 is connected to the junction point of the resistances R3 and R*i* which are connected between battery and ground i.e., to a potential of −24 volts. This potential is sufficient to operate the detector PD3 although no fault has occurred in the decoder circuit. Hereby it should be noted that the current flowing through the above potentiometer R3, R*i* has no influence on the operated condition of the relay L*tr*1. However, when in the decoder circuit DCAB which is supposed not to be operated one of the diode rectifiers is short circuited, e.g., *d*1, a current is able to flow in the following circuit: ground, resistance R′*a*, column wire *a*′, short circuited diode rectifier *d*1, winding of relay L*tr*1, row wire *i*1, resistances R′*i* and R3, battery of −48 volts. Due to this the potential at the junction point of the resistances R3 and R′*i* becomes equal to about −32 volts which is sufficient to operate the potential detector PD3. Thus the presence of the short circuited diode rectifier *d*1 may be detected.

The presence of an open-circuited diode rectifier is detected by the fact that the associated relay L*rt*1–32 does not operate upon activating the corresponding row and column wires.

Instead of considering the check circuit DCAB as described above, it may also be said that it is associated to a plurality of asymmetrical impedances constituted by diode rectifiers and arranged at the cross-points of a two-coordinate matrix having a plurality of row and column wires *i*1, ..., *l*1 and *a*1, ...,*h*1, each pair of row and column wires being able to be coupled across the poles of the DC source (ground; −48 volts) in order to modify the state of the impedance arranged at the cross-point of this pair of wires. In this check circuit DCAB, each said pair of row and column wires is connected in series with resistances R3; R′*i*, ..., R′*e*; R′*a*, ... R′*h* across the poles of another DC source (−48 volts, ground) of opposite polarity to the first so as not to influence the state of the asymmetrical impedances. This check circuit further includes detecting means PD3 associated with said resistances to detect an increase of current therethrough beyond a predetermined value e.g., due to a short circuit of one of the asymmetrical impedances.

The above-described control circuit TM1 offers a high reliability. Indeed, due to the fact that it includes two code store circuits CSCA and CSCB, two decoder circuits DCA and DCB and two check circuits CCA and CCB, the single decoder circuit DCAB may be controlled either via CSCA, DCA and CCA or via CSCB, DCB and CCB. Simultaneous control is prevented due to the existence of the relays Z*r* and Z'*r*. Moreover, a short circuited or open-circuited diode rectifier in the single decoder circuit, which is built up with very reliable elements, only affects the corresponding cross-point of the decoder circuit.

The above control circuit TM1 is also built up in an economic way even when considering only the code store circuit CSCA, the decoder circuit DCA and the decoder circuit DCAB. Indeed, due to the presence of these two decoder circuits the present control circuit TM1 is far much simpler than one which would only include a single decoder circuit since the latter would have to comprise 32 gates each with five inputs connected to the outputs of the bistate devices BS1–5 and each having its output coupled to a distinct one of the 32 relays L*tr*1–32. In this case not only a larger number of gate inputs are required than in the embodiment of FIG. 4, but since each gate must be able to operate the associated relay a power amplifier must be included between each gate output and the corresponding relay so that also the number of power amplifiers required is much higher than in the present control circuit. Moreover, the direct control of the relays L*tr*1–32 entails the drawback that when using transistors for the above power amplifiers no good decoupling is ensured between the code store circuit and the decoder circuit. In the present control circuit each gate output controls an auxiliary relay which itself controls the decoder circuit DCAB through a make contact so that an excellent decoupling is obtained. Moreover, these auxiliary relays form part of code check circuits, as described above, so that they fulfill a double function.

In the above it has been described how codes are stored in the control circuits TM1–4, due to which cross-point relays are operated therein, whereafter the timing means successively close the timing make contacts, such as T3, in these control circuits. This means that the make contact of each operated cross-point relay is closed at a moment none of the two terminals to be thus interconnected is coupled to a DC source. The consequence thereof is that the lifetime of these relay make contacts is high when compared with an arrangement wherein each of these contacts would interconnect terminals one of which is already connected to a DC source.

Instead of successively closing the timing make contacts, such as T3, in the control circuits TM1–4 the timing means may also close these contacts simultaneously since this does not affect the successive operation of the switching stages. In order to maintain the last-mentioned advantage of high lifetime of the cross-point relay make contacts it is then however absolutely necessary to close all these relay make contacts before the simultaneous closure of the timing make contacts since each relay make contact would otherwise interconnect terminals one of which is already connected to a DC source. This means that all the codes controlling the operation of the cross-point relays must be inscribed in their respective code store circuits of the control circuits TM1–4 within a relatively small time interval. On the contrary, when proceeding as described above the store of the codes in the control circuits, more particularly in the control circuits TM2–4 may be delayed, without losing the above advantage. Such a delay may be required by the source delivering these codes.

While the principles of the invention have been described above in connection with specific apparatus, it is to be clearly understood that this description is made only by way of example and not as a limitation on the scope of the invention.

I claim:

1. An improved automatic switching system for use in an automatic telecommunication system wherein the terminals of a switching network are connected to junctor circuits, line circuits and outgoing trunk circuits, said switching network having a plurality of inlets and outlets, wherein the improvement comprises:

a plurality of switching paths formed between pairs of said inlets and outlets;

a plurality of switching stages, at least two of said switching stages coupled to a selected one of said plurality of switching paths; and a common control circuit, said common control circuit including a plurality of control circuits, one of said plurality of control circuits for controlling inputs and outputs of said junctor circuits and the remainder of said plurality of control circuits for controlling a respective pair of switching stages.

* * * * *